(12) United States Patent
Jo (10) Patent No.: US 7,782,012 B2
(45) Date of Patent: Aug. 24, 2010

(54) MP3 PLAYING AND CHARGING SYSTEM COMPRISING A DOCKING STATION HAVING AN ADAPTER FOR INSTALLING MP3 AND A DYNAMIC SPEAKER

(75) Inventor: Su Hwan Jo, Kwangmyung (KR)

(73) Assignee: Diasonic Technology Co., Ltd, Anyang, Kyungki-do (KR)

( * ) Notice: Subject to any disclaimer, the term of this patent is extended or adjusted under 35 U.S.C. 154(b) by 603 days.

(21) Appl. No.: 11/883,105

(22) PCT Filed: Sep. 28, 2005

(86) PCT No.: PCT/KR2005/003215

§ 371 (c)(1),
(2), (4) Date: Jul. 24, 2007

(87) PCT Pub. No.: WO2006/080659

PCT Pub. Date: Aug. 3, 2006

(65) Prior Publication Data

US 2008/0157716 A1 Jul. 3, 2008

(30) Foreign Application Priority Data

Jan. 28, 2005 (KR) .................. 20-2005-0002684 U (51) Int. Cl.
*H02J 7/00* (2006.01)

(52) U.S. Cl. .................. 320/115; 361/679.41; 381/335; 381/336; 381/385; 455/23; 455/205

(58) Field of Classification Search ................. 320/115; 361/679.41; 710/303; 369/6, 8; 181/198
See application file for complete search history.

(56) References Cited

U.S. PATENT DOCUMENTS

| 4,199,657 A * | 4/1980 | Lane ........................ 381/300 |
| 4,754,901 A * | 7/1988 | Villanueva et al. .......... 224/418 |
| 5,253,933 A * | 10/1993 | Walker .................... 312/351.7 |
| 6,091,225 A * | 7/2000 | Kim et al. .................. 320/114 |
| 6,509,716 B2 * | 1/2003 | Yi .............................. 320/115 |
| 6,523,079 B2 * | 2/2003 | Kikinis et al. ............... 710/303 |
| 6,591,085 B1 | 7/2003 | Grady |
| 7,242,165 B2 * | 7/2007 | Lee et al. .................... 320/115 |
| 2003/0002395 A1 | 1/2003 | Chang et al. |
| 2003/0095380 A1 * | 5/2003 | Chen et al. ................ 361/686 |
| 2004/0162029 A1 | 8/2004 | Grady |
| 2005/0088620 A1 * | 4/2005 | Dwyer et al. ................ 353/15 |

* cited by examiner

*Primary Examiner*—Jay M Patidar
*Assistant Examiner*—Arun Williams
(74) *Attorney, Agent, or Firm*—Ladas & Parry, LLP

(57) ABSTRACT

In this present invention, MP3 playing and charging system having an adapter for installing MP3 and dynamic speakers which includes a docking station and two speakers that can be used in attached or separated manner; two speakers that allow variation of speaker direction generating dynamic sound when attached; and a docking station that can be attached and connected to MP3 player with the use of MP3 installing adapter when connecting MP3 to the docking station is provided.

3 Claims, 8 Drawing Sheets

MP3 PLAYING AND CHARGING SYSTEM COMPRISING A DOCKING STATION HAVING AN ADAPTER FOR INSTALLING MP3 AND A DYNAMIC SPEAKER

TECHNICAL FIELD

The present invention relates to the field of MP3 playing and charging system having a MP3 player-installing adapter, docking station and dynamic speakers. More particularly, the present invention relates to MP3 playing and charging system that consists of speaker system of which its direction can be adjusted, and docking station that can securely attach and connect MP3.

BACKGROUND ART

In previous MP3 player systems, docking station for installing a MP3 and two speakers are used, completely separated from each other. This arrangement requires a great deal of space. In contrast to this, another method of arrangement is to attach a docking station and two speakers fixed to each other as one single unit. Further, when installing a MP3 onto a docking station, charging port of MP3 is inserted into charging port of docking station. In this setup, the connection between a MP3 and docking station is unstable. For instance, MP3 is operated in trembling manner.

Accordingly, in this present invention, MP3 playing and charging system having an adapter for installing MP3 and dynamic speakers which includes a docking station and two speakers that can be used in attached or separated manner; two speakers that allow alteration of speaker direction generating dynamic sound when attached; and a docking station that can be attached and connected to MP3 player with the use of MP3 installing-adapter, when connecting MP3 to the docking station is provided.

DISCLOSURE OF THE INVENTION

MP3 playing and charging system of the present invention comprises speakers that can be assembled and dissembled, having a hexagonal shaped protrusion on upper and lower parts of the speakers that when assembling two speakers in vertical manner, the hexagonal shaped protrusion on the upper speaker of which is interlocked onto the lower hexagonal shaped groove on the lower speaker, and allowing adjustment of direction of upper and lower speakers according to the direction of insertion as above; a MP3 installing adapter having a sloped bottom surface, a lateral structured slot on lower bottom surface, and oppositely formed four protrusion locks around upper edge in lengthwise manner; a MP3 playing and charging docking station having a rectangular shaped concaved opening featured on top, a sloped bottom surface of the said opening in order to offset a slant of bottom surface of the said opening, a charging jack projected from the bottom surface of the said opening, a receptor with four miniature holes oppositely formed on top of the said opening horizontally, and an indentation used in removing the said adapter from the said docking station.

Also, when installing a MP3 onto the said docking station, the said adapter is inserted into the concaved opening of the upper part of the docking station; the charging jack of the docking station protrudes through lengthwise slot of the lower part of the adapter; and four protrusion locks of the adapter are meshed into the four miniature holes of the said receptor of the upper part of the concaved opening of the station. In this position, the charging port of MP3 is inserted into the charging jack of docking station.

In one example, MP3 playing and charging system of the present invention further comprises a docking station providing earphone jack and charging jack that connect earphone port and charging port.

BEST MODE FOR CARRYING OUT THE INVENTION

Referring to the attached drawings, MP3 playing and charging system having a docking station and dynamic speakers in order to attach MP3 of the present invention is described in detail.

Figure 1:
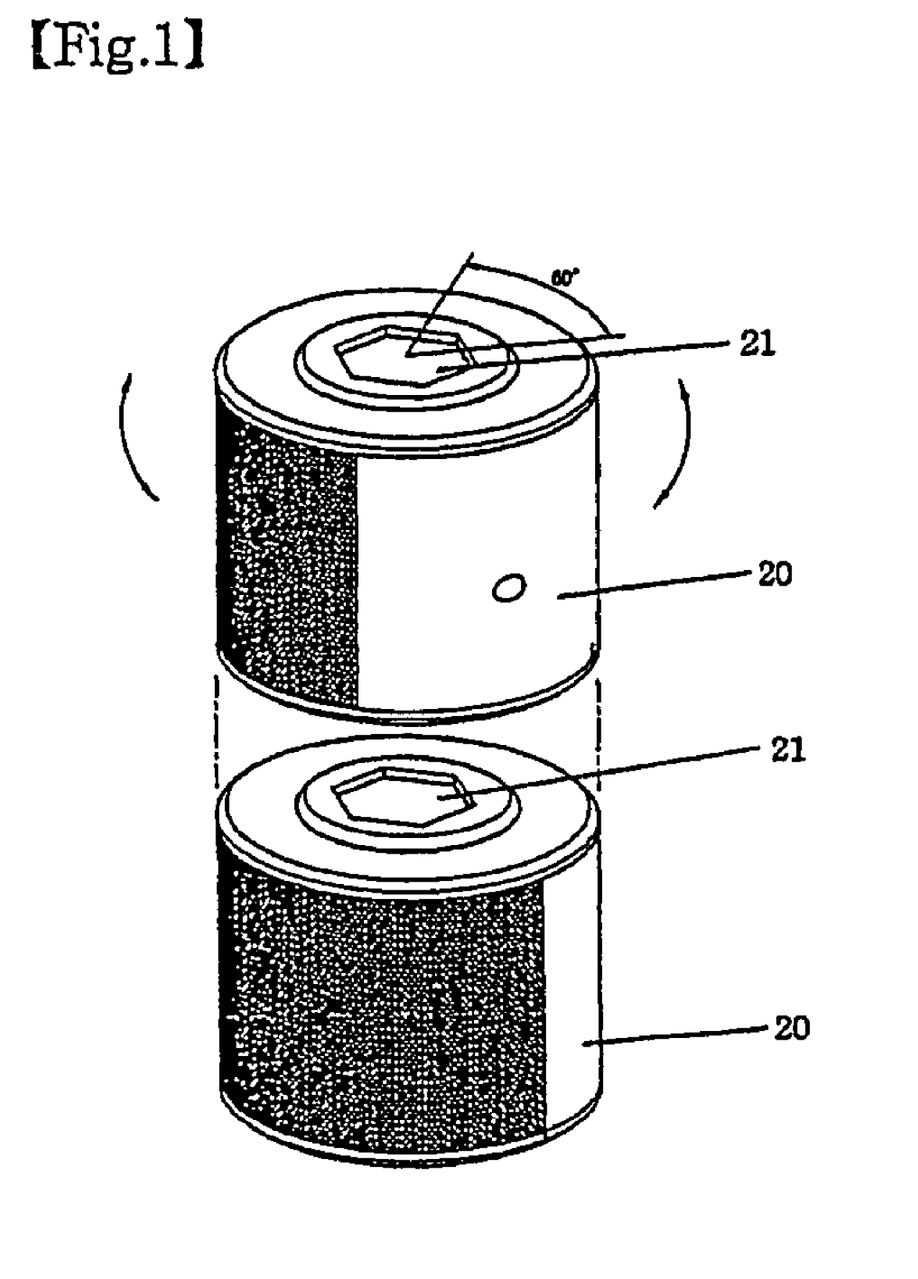
FIG. 1 is a perceptive view showing assembly construction of dynamic speaker system with its direction adjusted according to the present invention.
Figure 1A:
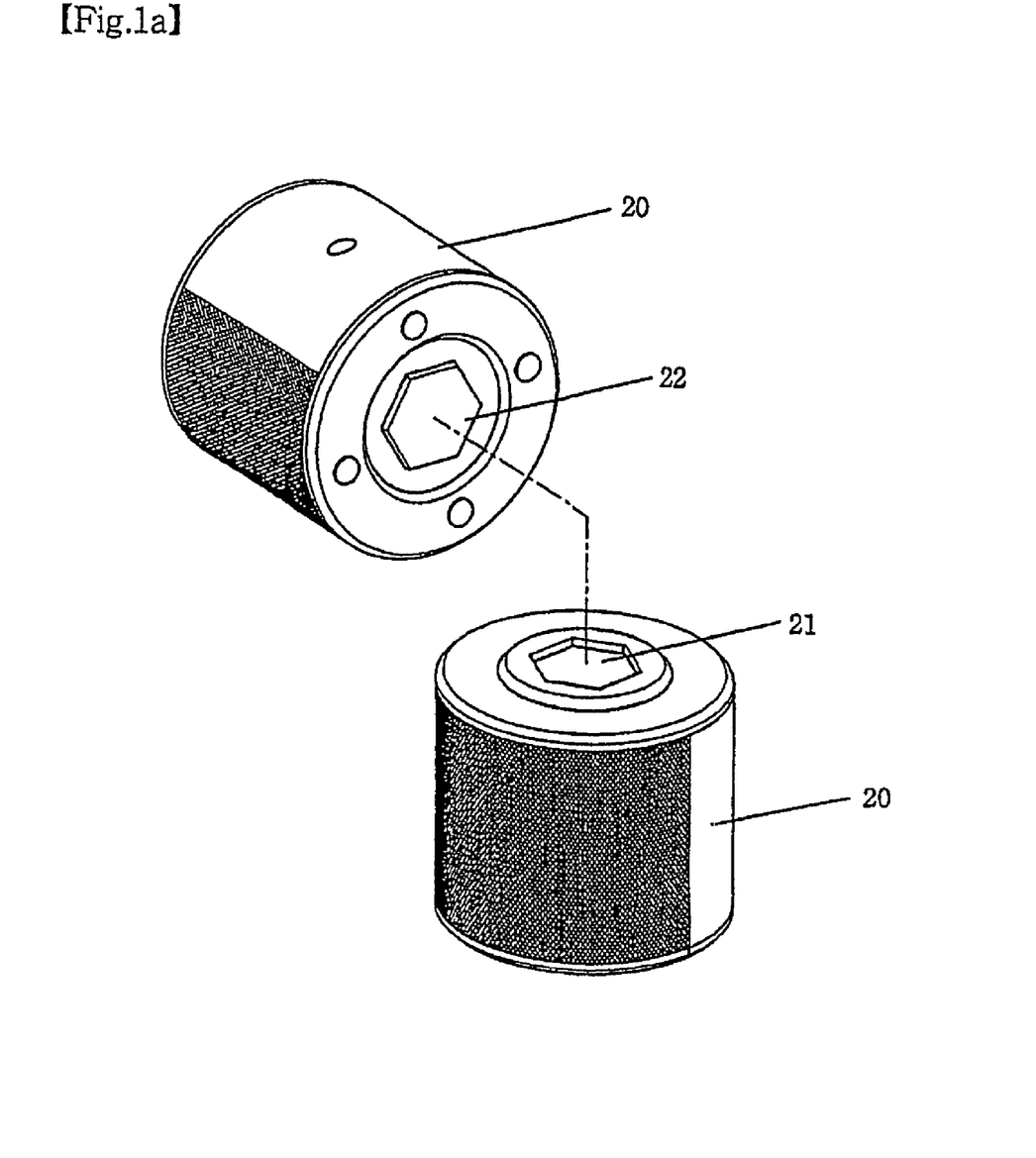
FIG. 1a is a perspective view showing assembly construction of dynamic speaker system.

FIG. 1 and FIG. 1a are perceptive views showing assembly constructions of dynamic speaker system according to the present invention. As shown in the FIG. 1 and FIG. 1a, according to the present invention the speakers (20) provide a hexagonal groove (21) of the upper part and a hexagonal protrusion (22) of the lower part. The upper hexagonal groove (21) and the lower hexagonal protrusion (22) are shaped oppositely to each other. When attaching the speakers, the hexagonal protrusion (22) of the said lower part is inserted into the hexagonal groove (21) of the said upper part. Furthermore, by changing the inserting direction of the hexagonal groove (21) to the hexagonal protrusion (22), the direction of upper and lower speakers (20,20) can be adjusted. By adjusting direction of speakers in this manner, dynamic like music is generated from speakers as transmitting angle of sound is amplified.

Figure 2:
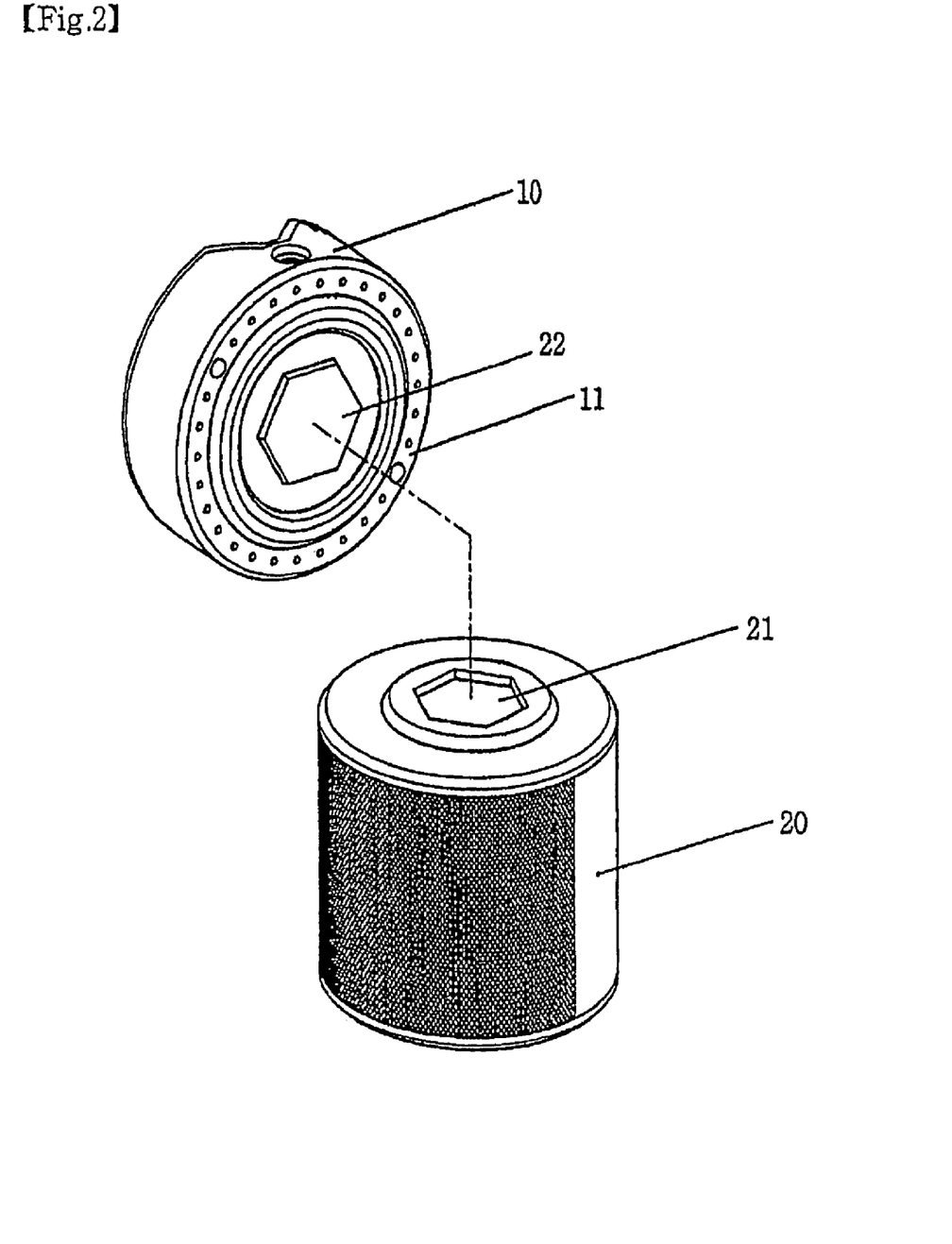
FIG. 2 a perspective view showing assembly construction of docking station and dynamic speakers of the present invention.

FIG. 2 is a perspective view showing assembly construction of docking station and dynamic speakers of the present invention. Illustrated in FIG. 2, the hexagonal protrusion (22) is provided to the lower part of docking station (10). The hexagonal groove (21) of the upper part of the speaker (20) of lower part of the docking station (10) and the hexagonal protrusion (22) of the docking station (10) are placed oppositely to each other. When assembling a MP3 playing and charging system according to the present invention, the hexagonal protrusion (22) of the docking station (10) is inserted into the hexagonal groove (21) of the lower part of the speaker (20). Consequently, the assembly of MP3 playing and charging system that enables adjusting of direction of the upper and lower speakers (20, 20) referring to the present invention is completed. In addition, a LED mood lamp (11) is provided on the lower part of the said docking station (10).

Figure 3:
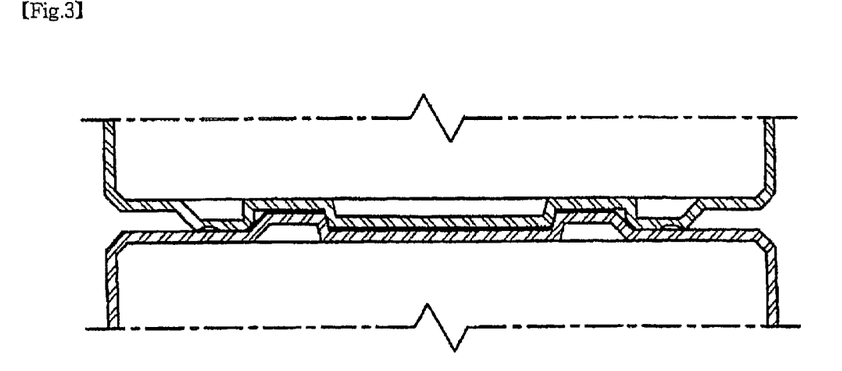
FIG. 3 is a sectional view drawing that shows the assembly mode of the dynamic speaker system according to the present invention.

FIG. 3 according to the present invention is a sectional view showing the assembly mode of the dynamic speaker system. As demonstrated in FIG. 3, the hexagonal groove (21) of the upper part of the speaker is inserted into the hexagonal protrusion (22) of the lower part of the speaker.

Figure 4:
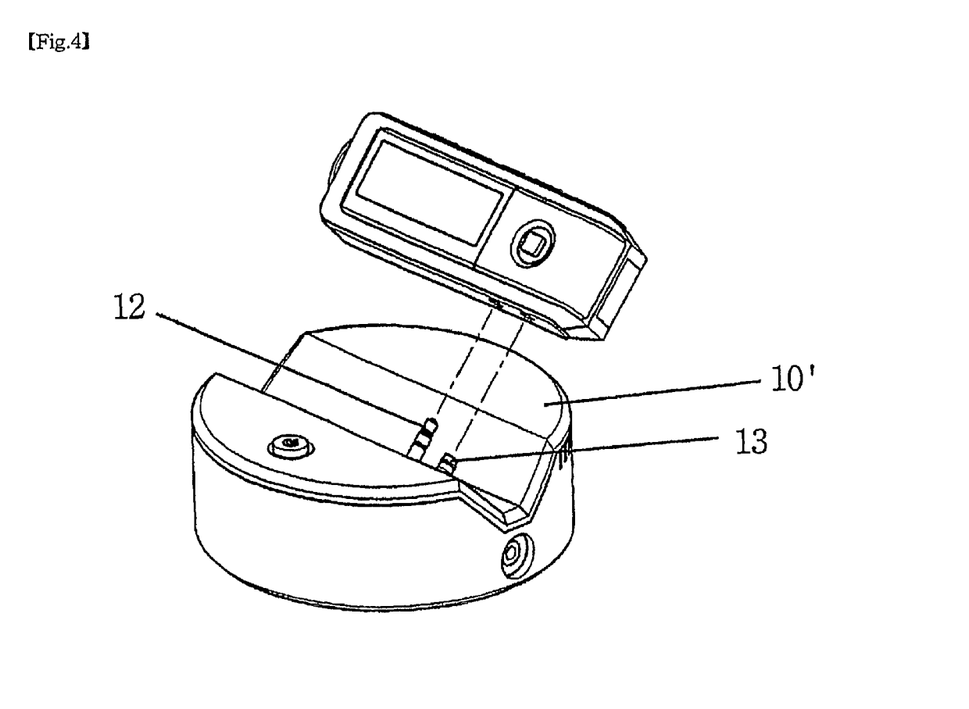
FIG. 4 a perspective view showing one example of the assembly construction when installing a MP3 onto the docking station.

FIG. 4 is a perspective view showing one example of the assembly construction when installing a MP3 onto the docking station. As shown in FIG. 4, an earphone jack (12) and a charging jack (13) are provided in the said docking station (10'). The said earphone jack (12) and the charging jack (13) are assembled into an earphone port and charging port of a MP3. Consequently, as shown in the FIG. 1 example of the present invention, the function of playing and charging of the MP3 playing and charging system is performed.

Figure 5:
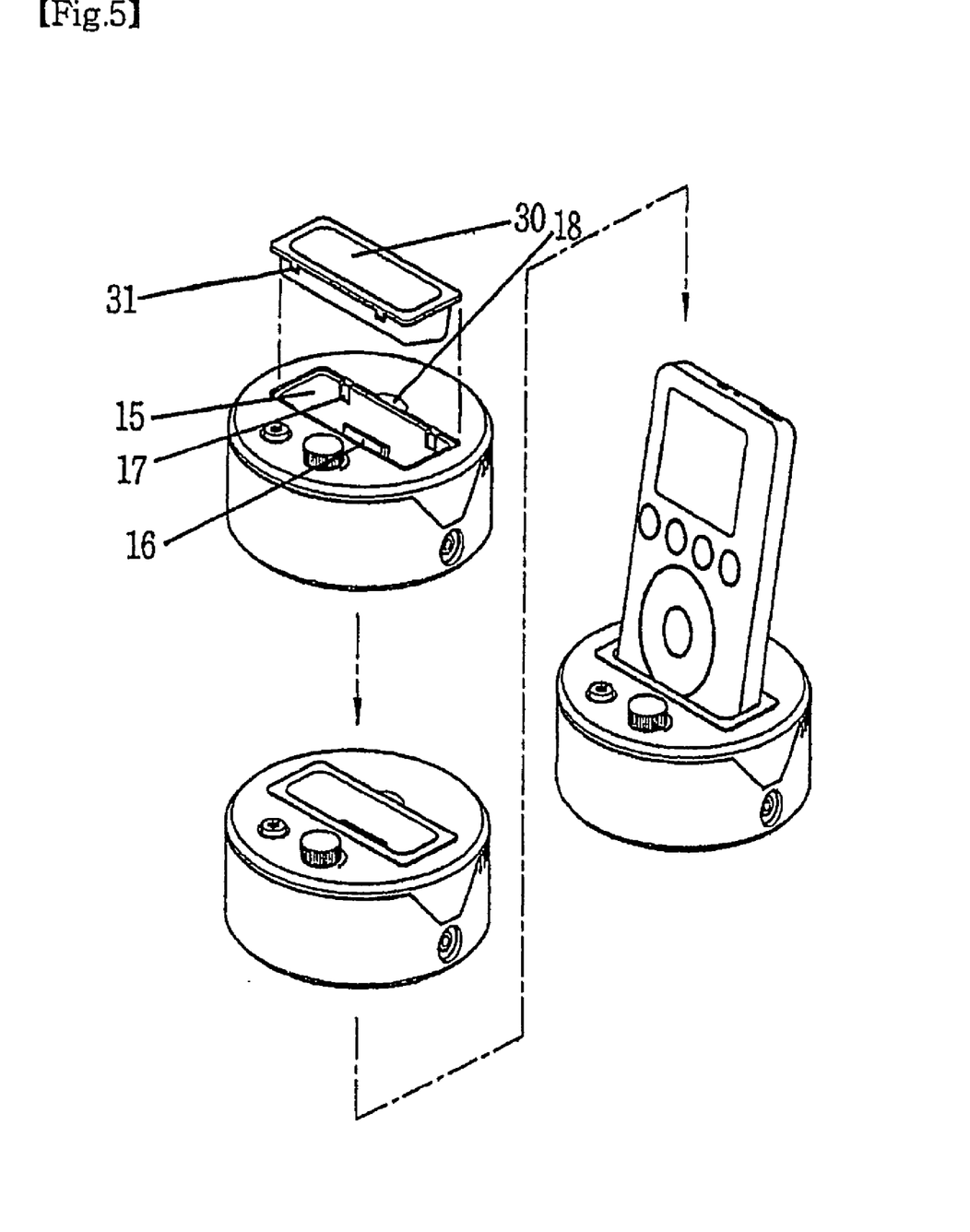
FIG. 5 is a dissembled view showing installation steps of a MP3 into docking station as referred by another example of the present invention.
Figure 6:
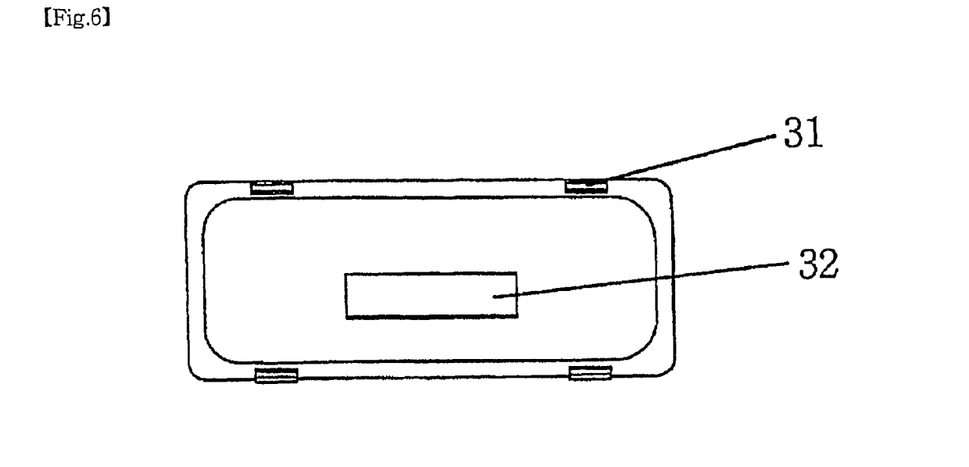
FIG. 6 is a top view of a MP3 installing adapter of FIG. 5.
Figure 7:
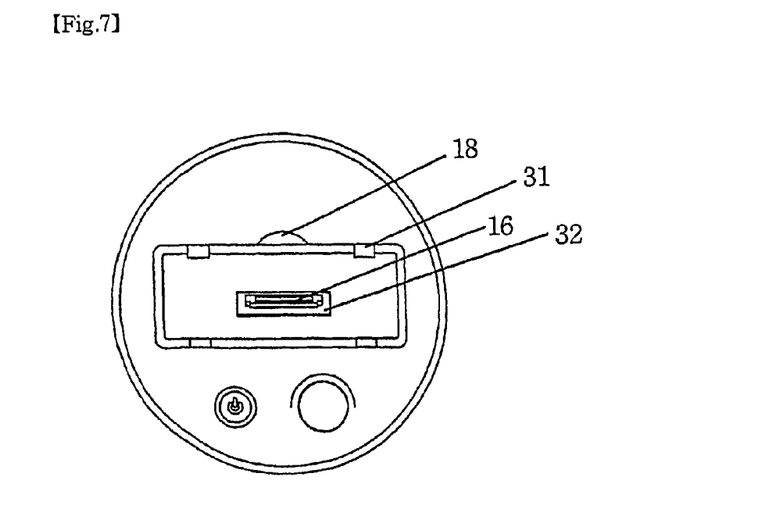
FIG. 7 is a top view of a docking station of FIG. 5.

FIG. 5, FIG. 6, and FIG. 7 are dissembled views showing installation steps of MP3 into docking station as referred by another example of the present invention. As illustrated in the said figures, a lengthwise slot (32) is formed on the lower part of the MP3 installing adapter (30) according to the present invention. Further, the bottom surface of the said adapter (30) is slightly slanted. Around upper edge of the said adapter (30), oppositely formed four protrusion locks (31) in lengthwise manner are provided. On the other hand, a rectangular shaped concaved opening (15) is featured on top of the docking station (10) as shown in this example. The bottom part of the said opening (15) is slanted to resist the slop of the bottom surface of the said adapter (30). The charging jack (16) is protruded from the bottom surface of the said opening (15). A receptor (17) with four miniature holes oppositely formed in a lengthwise manner is provided on top of the said opening (15). The said receptor (17) is shaped to mesh with the protrusion locks (31) of the adapter (30). An indentation (18) used for removing the said adapter (10) from the said docking station is provided. Further, size and shape of the said adapter (30) and the rectangular shaped concaved opening (15) of the top of the docking station (10) can be changed depending on the size and shape of MP3s.

In order to install MP3 onto the said docking station (10), the said adapter (30) is inserted into the concaved opening (15) of the upper part of the docking station (10). In this case, the charging jack of the docking station (10) is protruded through the lateral structured slot (32) of the lower part of the adapter (30). Also, the four protrusion locks (31) of the adapter (30) are meshed into the receptor (17) with four miniature holes of the concaved opening (15) of the upper part of the station (10). Under this condition, the charging port of MP3 is inserted into the charging jack of the docking station (10). Together, in the current example the installing operation of the docking station (10) of MP3 is completed. From the use of the said MP3 installing adapter (30), charging and playing of MP3 can be attained by securely installing a MP3 to the docking station (10).

Figure 8:
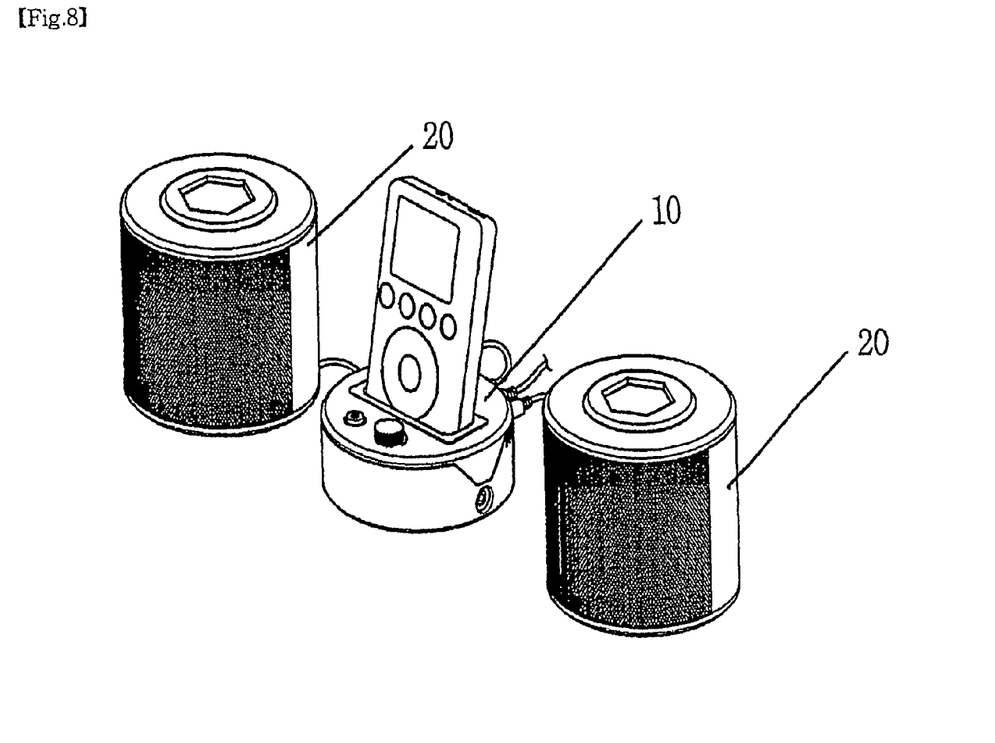
FIG. 8 as referred to the present invention is an illustration showing the dissembled mode of a MP3 playing and charging system.

FIG. 8 as referred to the present invention is an illustration showing the dissembled mode of a MP3 playing and charging system. As shown in FIG. 8, according to the said example of the present invention a MP3 is installed onto the docking station (10). In this executing example, the docking station (10) and the dynamic speakers (20, 20) are dissembled. However, the said docking station (10) and the dynamic speakers (20, 20) can be assembled as one unit for use.

Figure 9:
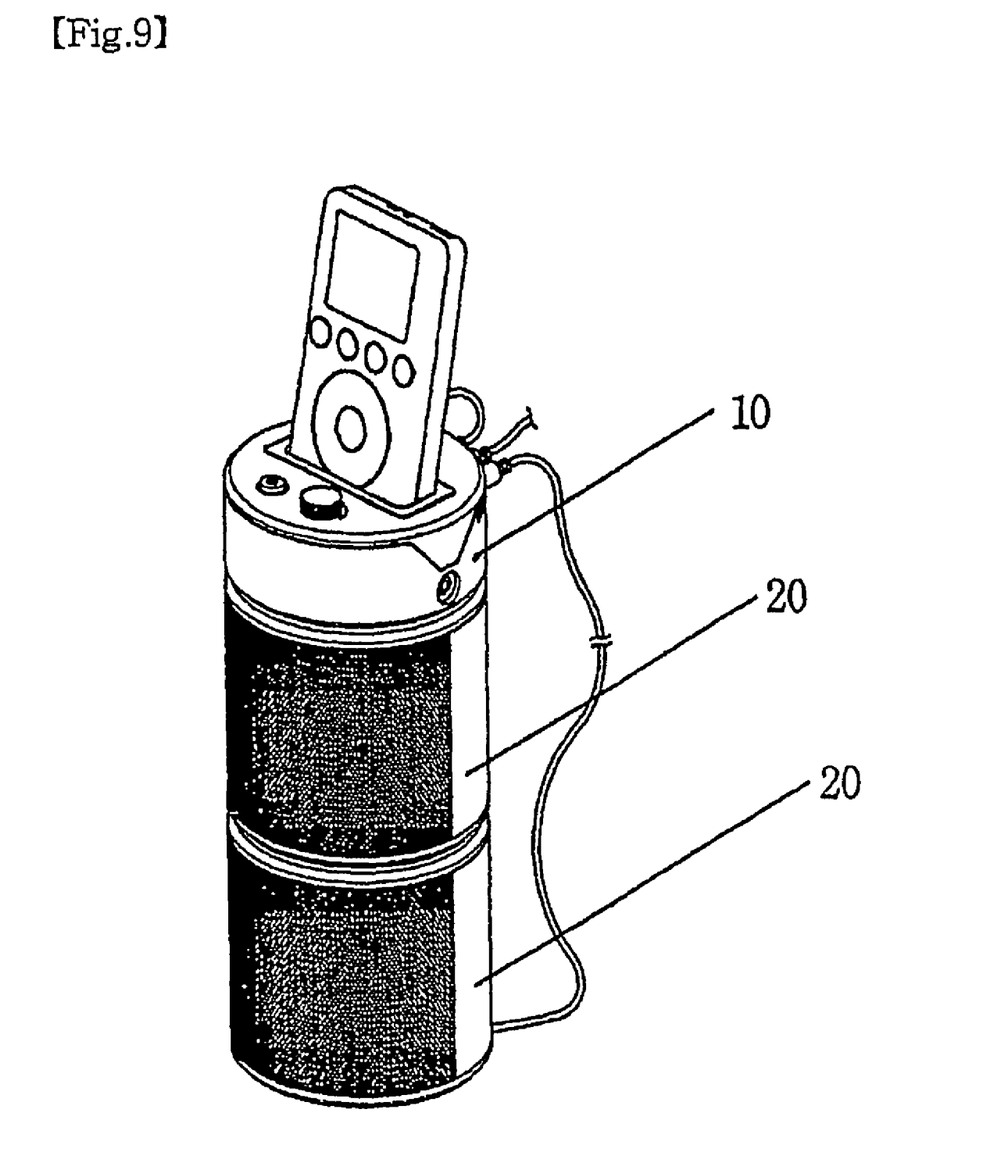
FIG. 9 as referred to the present invention is an illustration showing an assembled mode of a MP3 playing and charging system.

FIG. 9 as referred by the present invention is an illustration showing an assembled mode of a MP3 playing and charging system. As shown in FIG. 9, according to the said example of the present invention a MP3 is installed in the docking station (10). In this example, the docking station (10) and the dynamic speakers (20, 20) are assembled together as one single unit. However, the said docking station (10) and the dynamic speakers (20, 20) can be dissembled from each other for use.

According to MP3 paying and charging system including docking station and dynamic speakers having adapter in order to install MP3 of the present invention, docking system and speaker can be used assembled or dissembled. Therefore, MP3 playing and charging system can be arranged in a number of ways depending on a given condition of place or space availability. Particularly, when assembled as one unit, installation space needed could be saved.

Moreover, in MP3 paying and charging system including docking station and dynamic speakers having adapter in order to install MP3 of the present invention, MP3 is installed immovably onto docking station by using adapter. Therefore, MP3 playing and charging system of the present invention is operated in stable condition.

Further, according to MP3 paying and charging system including docking station and dynamic speakers having adapter in order to install MP3 of the present invention, transmitting direction of speaker sound can be adjusted. Therefore, MP3 playing and charging system of the present invention, by adjusting direction of speakers accordingly, dynamic like music is generated from speakers as transmitting angle of sound wave is amplified.

INDUSTRIAL APPLICABILITY

The present invention provides of MP3 playing and charging system having a MP3 player-installing adapter, docking station and dynamic speakers. In addition, the present invention can be used in the field of MP3 playing and charging system that consists of speaker system of which its direction can be adjusted, and docking station that can securely attach and connect MP3.

The invention claimed is:

1. MP3 playing and charging system having a docking station and dynamic speakers, including an adapter for installing MP3 comprises:

speakers (20, 20) individually having a hexagonal shaped protrusion (22) on upper and lower parts of the speakers that can be assembled and dissembled, that when assembling two speakers (20, 20) in vertical manner, the hexagonal shaped protrusion (22) on the upper speaker is interlocked onto the lower hexagonal shaped groove (21) on the lower speaker, and by adjusting the direction of insertion, the direction of upper and lower speakers can be changed separately, MP3 installing adapter (30) having a slightly slanted bottom surface, a lateral structured slot (32) of the lower part of the said bottom surface, and oppositely formed four protrusion locks (31) around upper edge in a lengthwise manner, and MP3 playing and charging docking station (10) having a rectangular shaped concaved opening (15) featured on top, bottom surface of the said opening (15) in order to offset a slanted bottom surface of the said adapter (30), charging jack (16) projected from the bottom surface of the said opening (15), receptor (17) with four miniature holes oppositely formed on top of the said opening (15)

in lengthwise manner and indentation (18) used in removing the said adapter (30) from the said docking station (10).

2. The MP3 playing and charging system according to claim 1, which further includes docking station (10') having earphone jack (12) and charging jack (13) that are inserted into earphone port and charging port of MP3.

3. The MP3 playing and charging system according to claim 1, which the said adapter (30) is inserted into the top of the concaved opening (15) when installing MP3 onto the said docking station (10); the charging jack (16) of the docking station (10) protrudes through the lengthwise slot (32) of the lower part of the adapter (30); and four protrusion locks (31) of the adapter (30) are meshed into the four miniature holes of the receptor (17) of the upper part of the concaved opening (15) of the docking station (10), and in this mode, the charging port of MP3 player is inserted into the charging jack (16) of the docking station (10).

* * * * *